United States Patent [19]

Ohmori et al.

[11] Patent Number: 4,893,133
[45] Date of Patent: Jan. 9, 1990

[54] THERMAL PRINTING APPARATUS FOR FORMING A CONTINUOUS TONE DYE IMAGE

[75] Inventors: Seishi Ohmori; Wayne F. Niskala, both of Tokyo, Japan

[73] Assignee: Eastman Kodak Company, Rochester, N.Y.

[21] Appl. No.: 357,655

[22] Filed: May 25, 1989

Related U.S. Application Data

[63] Continuation of Ser. No. 138,624, Dec. 28, 1987, abandoned.

[30] Foreign Application Priority Data

Mar. 6, 1987 [JP] Japan .................................. 62-51386

[51] Int. Cl.⁴ ............................................ G01D 15/10
[52] U.S. Cl. ............................................... 346/76 PH
[58] Field of Search .................... 346/76 PH; 400/120; 219/216, 216 PH

[56] References Cited

U.S. PATENT DOCUMENTS

| | | | |
|---|---|---|---|
| 4,621,271 | 11/1986 | Brownstein | 346/76 PH |
| 4,622,560 | 11/1986 | Withoos | 346/76 PH X |
| 4,691,211 | 9/1987 | Brownstein | 346/76 PH |
| 4,745,413 | 5/1988 | Brownstein et al. | 346/76 PH |

Primary Examiner—J. R. Scott
Attorney, Agent, or Firm—Raymond L. Owens

[57] ABSTRACT

Thermal printing apparatus for forming a continuous tone dye image composed of dye image pixels each image pixel having a different possible dye density level. The thermal printing apparatus comprises a thermal print head including N heating elements, each heating element being addressed during a consecutive heating cycle. No more than L consecutive heating elements are addressed during a given heating cycle and at least one different heating element is addressed during the next heating cycle wherein N is at least equal to 2 times L and L and N are integers.

1 Claim, 5 Drawing Sheets

THERMAL PRINTING APPARATUS FOR FORMING A CONTINUOUS TONE DYE IMAGE

This is a continuation of application Ser. No. 138,624 filed Dec. 28, 1987 (now abandoned).

FIELD OF THE INVENTION

This invention relates to an apparatus for driving or energizing heating elements for use in thermal transfer print heads and also to novel apparatus for driving heating elements in which so-called group lines on an image receptor sheet are minimized.

DESCRIPTION OF THE PRIOR ART

An example of the prior art apparatus for driving heating elements of a thermal transfer printing head to form a continuous tone dye image composed of dye image pixels is explained with reference to FIG. 1. In this drawing, numeral 50 designates heating elements provided in a thermal transfer print head, each of which is connected at its one end to a power source of a constant voltage Vs and at the other end to an output of each of gates 51. These heating elements are grouped into four groups I-IV, each including 128 heating elements, and the gates connected to the heating elements of each group are supplied at their one input with an enable signal ENI II, III, or IV for enabling each group of the gates to be operated. The other input of each of the gates is connected to a corresponding stage of a latch 52, and the respective stages of the latch 52 are connected to corresponding stages of a shift register 53.

An image signal produced by scanning an object to be copied, such as a photograph, document, painting or the like, is stored as a digital image in a memory 54. Since a line of image pixels is printed one at a time on an image receptor sheet by the heating elements arranged in an array, binary image data corresponding to a dye density level or concentration on the receptor sheet printed by the heating elements is stored line-by-line in memory locations in the memories 54. The amount of dye to be transferred to each image pixel of a receptor sheet is increased as the temperature of the corresponding heating elements rises, and so if it is required to provide a density level having 128 steps, for example, the image data must be stored in the memory 54 so that each heating element can be driven a maximum of 128 times when one line of image pixels is printed. Thus, the binary data is fed 128 times from the memory 54 to an interface 55 when printing one line. Namely, for the first time, the interface 55 supplies a clock signal to the shift register 53, and the binary data derived from the memory 54 is stored as "1" or "0" in the respective stages of the shift register 53, and after completion of the storage a latch signal is fed to the latch 52 so that "1" or "0" stored in the respective stages of the shift register 53 is shifted to the respective stages of the latch 52.

Then, the interface 55 first produces the enable signal ENI to apply "1" to one input of the gates within the group I. Thus, the gates corresponding to the steps of the latch 52 storing "1" opens so that a current flows through the heating elements corresponding to such stages and no current flows through the heating elements corresponding to the stages storing "0". In this manner, the first driving operation is accomplished. The interface 55 writes the binary data for the second driving operation into the shift register 53 during the period of time when the heating elements in the group I are being selectively driven, and so the second driving operation is similarly achieved, and thereafter selective driving operations of the heating elements are performed up to the 128th time, whereupon the control of group I is ceased. The interface 55 then de-energizes the enable signal ENI, and selectively drives the heating elements of group II 128 times in a similar manner to the case of group I. Thereafter, the enable signals for groups III and IV are sequentially produced by the interface 55 to drive the heating elements of groups III and IV. After group IV has been energized the printing of a line of image pixels is accomplished.

As explained above, it is conventional to reduce the current capacity of the thermal transfer print head by organizing the heating elements into several groups and controlling the drive or energization of the heating elements group at a time. Therefore, heat flows from the heating elements positioned at the ends of the group which is being driven or energized to the heating elements positioned at the ends of the adjacent groups which are not being driven, so the amount of heat available for dye transfer from the heating elements at the ends of the group will be lowered. Thus the portions printed by such heating elements has a lower concentration or density level, resulting in lines, referred to as group lines, on the image receptor sheet. This can significantly lower the print quality.

Such group lines may be avoided by simultaneous driving all the heating elements, but the current capacity of the power source must then be greatly increased.

SUMMARY OF THE INVENTION

It is, therefore, an object of the present invention to provide a thermal printing apparatus in which the power source is not subjected to excessive current loads and group lines on an image receptor sheet are minimized.

In order to attain the above-mentioned object, the thermal printing apparatus according to the present invention forms a continuous tone dye image composed of dye image pixels. Each image pixel has A different possible dye density levels. The thermal printing apparatus comprises:

a thermal print head for printing a line of image pixels, and including a number N of heating elements, each heating elements being adapted to be addressed during A consecutive heating cycles;

means for addressing no more than L consecutive heating elements during a given heating cycle and for addressing at least one different heating element during the next heating cycle, wherein N is at least equal to 2 times L and L and N are integers, said addressing means being adapted to address each heating element A times; and means for selectively energizing each heating element when addressed until each heating element is able to deliver energy to cause dye to transfer such that the desired image pixel dye densities in a line of image pixels are formed, whereby group line effects are minimized.

DESCRIPTION OF THE PREFERRED EMBODIMENTS

Figure 1:
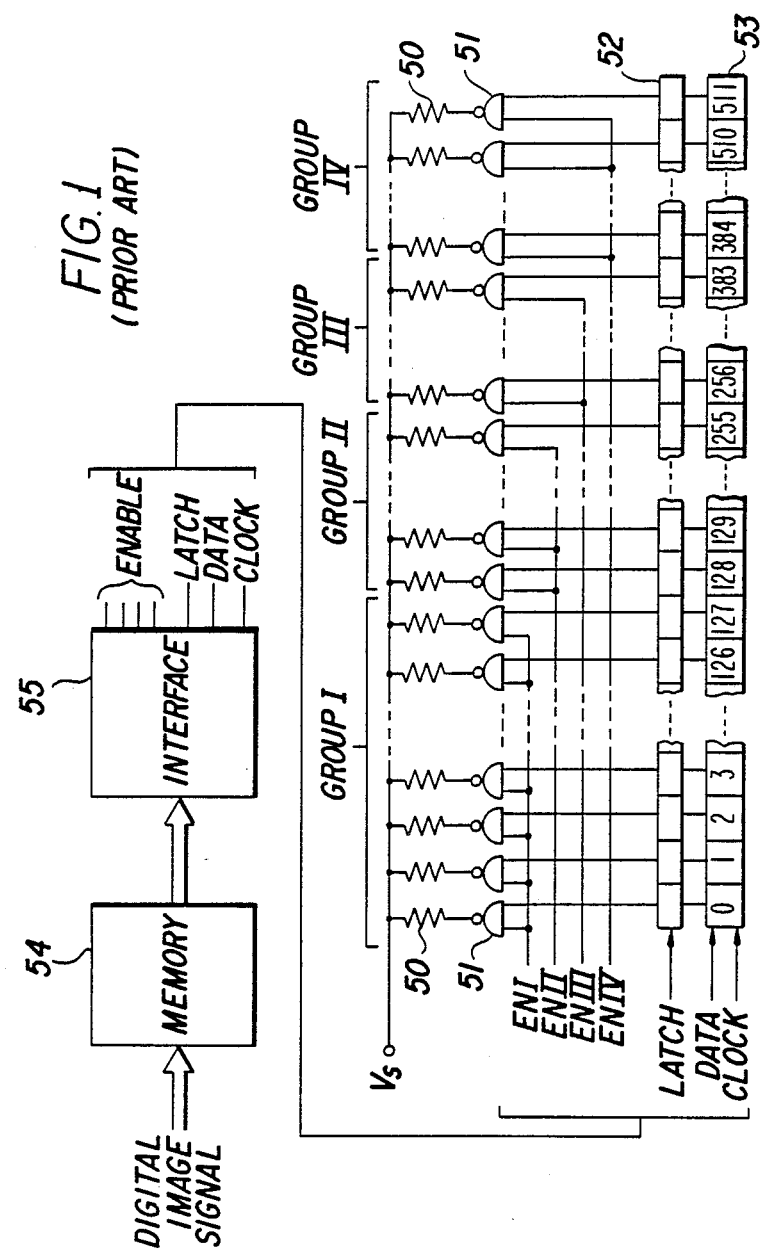
FIG. 1 is an example of the prior art heating element driving apparatus.
Figure 2:
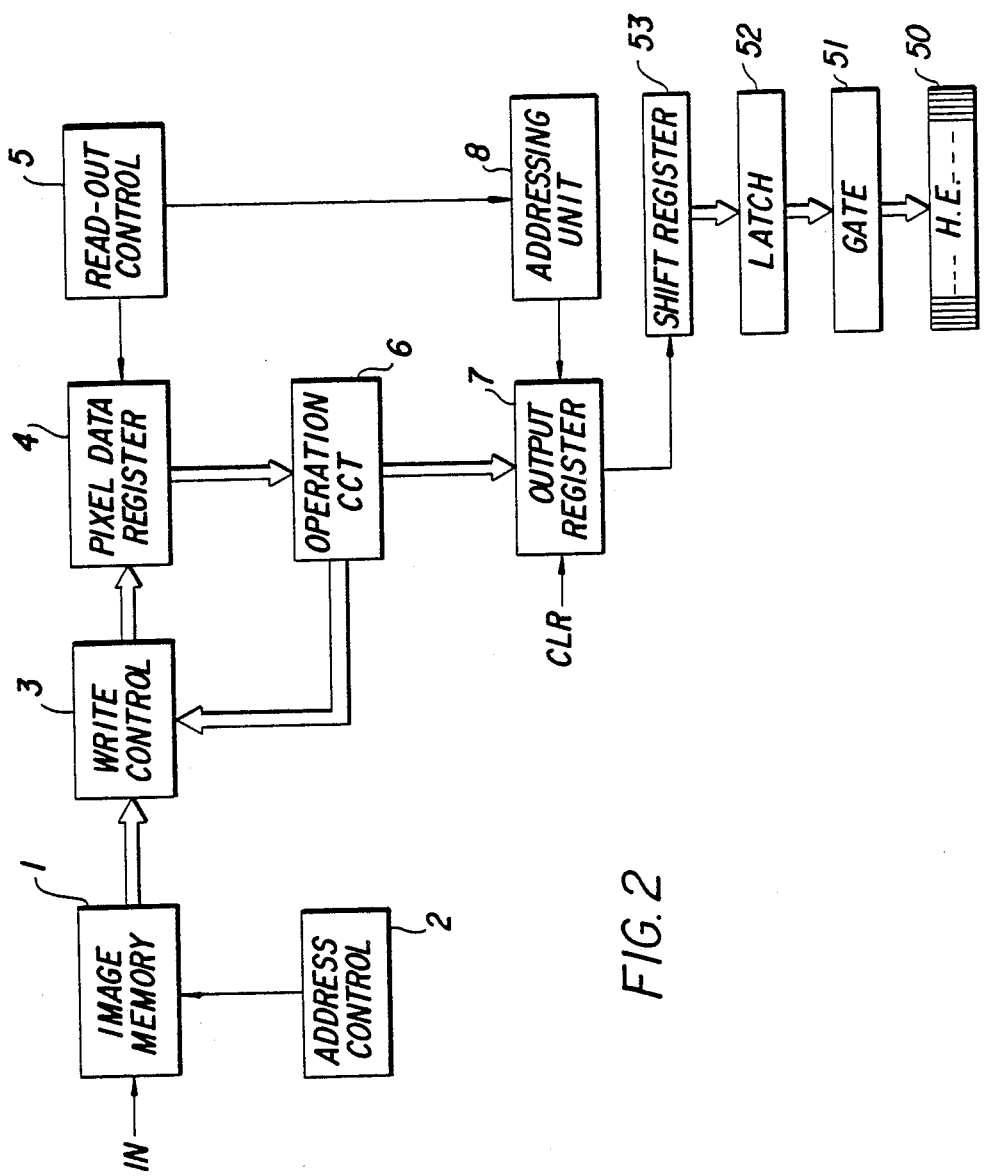
FIG. 2 is a block diagram showing a circuit arrangement of an embodiment of the heating element driving apparatus in accordance with the present invention.

In FIG. 2, the reference numerals referring to gates, latch and shift register, respectively, and are identical with those shown in FIG. 1. An image signal produced by sequential line-scanning of an object to be copied is digitized and written into an image memory 1. Addressing of locations for the digital data to be written into the image memory 1 is accomplished by address controller 2. Each data read into the image memory 1 is a digital signal corresponding to the density level or concentration of the image pixel on each of the scanning lines. The digital signal for representing such a density level is successively read out from the image memory 1 for every line scanned and written through a write-control unit 3 into a pixel data register 4 having the same number of memory locations as those of the heating elements 50. Namely, each of the memory locations stores data representing the density level of an image pixel and the heating element corresponding to that memory location.

The pixel data register 4 is connected to an operation circuit 6 which, in turn, performs the below-mentioned operation for the data read outtu from the data register 4. This operation is under the control of the read-out control unit 5. The results of the operaton are stored through the write-control unit 3 in the original memory locations of the pixel data register 4. "0" or "1" is written into each stage of an output register 7 having the same number of stages as those of the heating elements in accordance with the contents read out from the data register 4. An addressing unit 8 is controlled by the read-out control unit 5 to address such that the stages of the output register 7 and the memory locations of the data register 4 correspond respectively.

Figure 3:
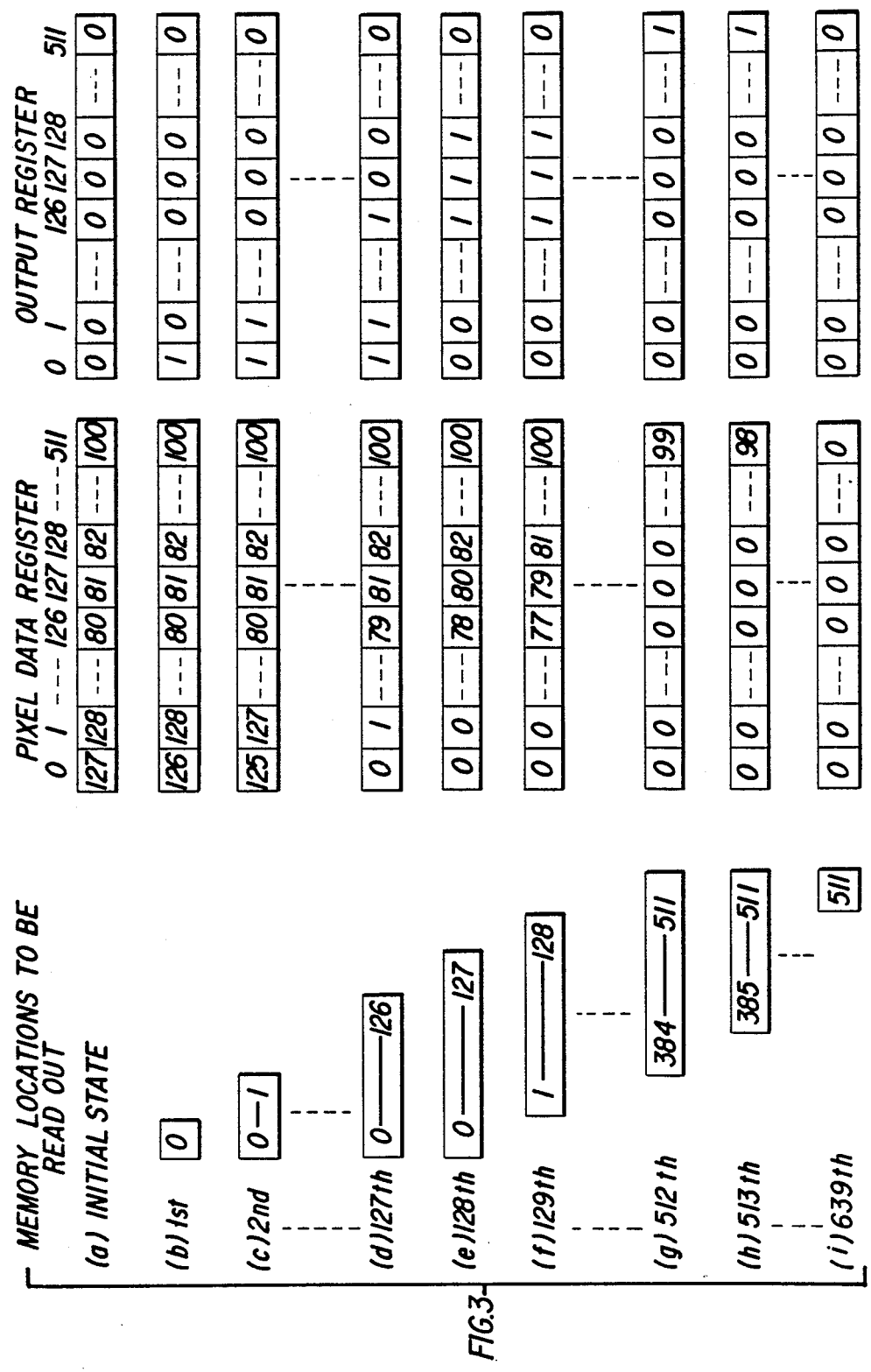
FIG. 3 is a complete illustration of nine different states of an operation 3(a)–3(i) of the heating element driving apparatus of FIG. 2.

The operation of the pixel data register 4, operational circuit 6, output register 7 and shift register 53 will now be described with reference to FIG. 3. By way of an example, let us assume the dye density level has 128 steps and the heating elements are 512 in number. FIG. 3, state 3(a) shows the initial condition under which the pixel data register 4 has the data of density level written in the respective memory locations and the output register 7 is in a fully zero condition set by a CLR line, operated by addressing unit 8. In the following description, for convenience, the data stored in the data register 4 and the calculation in the operation circuit 6 will use decimal numbers, and binary numbers will be used for the contents of the output register 7, and other loctions are written in quotation marks. For example, data 127 in a memory location of the data register 4 means that the heating element corresponding to this memory location is driven 127 times when printing a line of image pixels.

In such a condition, the memory location 0 is addressed and the data 127 in this memory location of the register 4 is read out by the read-out control unit 5. The operation circuit 6 operates as follows. If non-0 data is taken register 4, the circuit 6 subtracts 1 from such data (126) and the result of this calculation is output to the write-control unit 3. The result of the subtraction calculation for each data is stored through the write-control unit 3 in the original memory location of the data register 4. At the same time, in the output register 7, "0" is written into the stages corresponding to the memory locations of the data register 4, which are not addressed in the previous read-out, under the control of the read-out control unit 5 and the addressing unit 8. Thus, at the 1st time, the data 127 from the memory location 0 of the data register 4 is input into the operations circuit 6, and the results of the subtraction 126 is written in the memory location 0 of the data register 4 and "1" is written into the stage 0 of the output register 7. The condition of the data register 4 and output register 7 at the time when such procedure has finished is shown in FIG. 3, state (b). These contents of the output register 7 are fed to the shift register 53 to address and drive the heating element 0. While the heating element is being driven, the output register 7 is cleared by addressing unit 8 using the CLR line.

At the 2nd time, the memory locations 0 and 1 of the data register 4 are addressed and the data 126 and 128, stored in the memory locations 0 and 1, are read out by the read-out control unit 5. The operation circuit 6 subtracts 1 from 126 and 128 and outputs 125 and 127. The results 125 and 127 are stored in the original locations 0 and 1, respectively, of the data register 4, while "1" is also stored in stages 0 and 1 of the output register 7 (FIG. 3(c)), and thus the heating elements 0 and 1 are addressed and driven.

Thereafter, the range of the memory locations of the data register 4 from which the data are readout is expanded so that the number of memory locations is increased by 1 every time, such as the memory locations from 0 to 2, from 0 to 3, from 0 to 4, . . . In other words, the range in which the heating elements can be addressed is expanded in one direction so that the range increases by one heating elements for every read out. In this manner, the data now stored in the memory locations in the range, that is the result of the previous calculation are read out and the calculation is performed for every data. The results of the calculation are stored in the original memory locations of the data register 4, and, on the other hand, "1" or "0" is written into each of the corresponding stages of the output register 7 in response to the results of the calculation.

In the case of the 127th time of data read-out in which data of the memory locations 0–126 of the data register 4 are read out, the result of subtracting 1 from the data of the memory location 0 is 0; the data 80 of the memory location 126 is read out and the subtraction result 79 is stored in the original memory location 126 of the register 4; and "0" and "1" are written in stages 0 and 126, respectively, of the output register (FIG. 3, state 3(d)). At the 128th time, the data stored in memory locations 0–127 of the data register 4, i.e., the data of the stages 0–127 of FIG. 3, state 3(d) are read out (FIG. 3(d)). The state of the data register 4 and output register 7 after the calculation by the operation circuit 6 is shown in FIG. 3, state 3(e). At the time when the 128th time of read out from the data register 4 has finished the data of the memory location 0 is read out 128 times from the data register 4, the data of the memory location 127 times, the data of the memory location 2 126 times, . . . , the data of the memory location 126, 2 times and the data of the memory location 127, 1 time. At this time, "0" is stored into stage 0 of the output register in the first time.

The 129th read-out is performed on the data in the memory locations 1-128 of the pixel data register 4, and a similar operation is performed by the operational circuit 6. The results are stored in the original locations of the data register 4, while "1" or "0" is written into the appropriate stages of the output register 7 (FIG. 3, state 3(f)). Thereafter and until the 512th data is read out, the data in the 128 memory locations are always read out from the pixel data registers 4, and the range of the memory locations to be read out is displaced in the right direction by one memory location every time, such as 2-129, 3-130, 4-131, ..., 383-510, 384-511. From the 513th time, the range of reading out from the data register 4 is contracted by one memory location every time towards the memory location 511, and at the last 639th time only the data of the right end memory location 511 is read out and calculated.

As will be understood form the foregoing description, the range for reading out the data of density levels or concentrations for each line stored in the respective locations of the pixel data register 4 is expanded in one direction in such a manner that the range of the data read out increased by one memory location from the reference left end memorylocation and after the range expanded to the maximum range, this maximum range is maintained during the period of a predetermined number of times of reading out. Thereafter the range is reduced by one location towards the right end memory location, 511. It might be helpful to understand the present invention using the invention by analogy of the well known focal plane shutter found in 35 mm cameras. Let us conceptually consider a shutter is to be disposed between the pixel data register 4 and the output register 7. The shutter opens gradually from the left end, and is displaced in the right direction in its full opening condition while being maintained in that condition for a predetermined time. Thereafter the shutter is gradually closed towards the right end. With this operation the data of the register 4 within the range exposed through the shutter is read out.

After the above-mentioned process is completed for the data of the density levels for a line in the pixel data register, data of the density levels for the next line is then fed from the image memory 1 to the pixel data register 4, Thereafter the same process as described above is repeated.

In the above description, it is assumed that the number (N) of the heating elements is 512, the dye density level A being 128, and the maximum number of the memory locations from which data can be read from the data register 4, i.e., the maximum value (L) of the range for addressing the heating elements at any given time being 128. However, N and L may be set such that L/N is lower than the duty ratio of the thermal transfer head and N/L is an integer. Moreover A is equal to K times L, wherein K is a positive integer. In the above-described embodiment, K=1, and A=L=128. In case of K=2, L=128 and A=256, for example, the range of reading out of the data from the data register 4 may be varied by one memory location for every two times of reading out the data from the register 4.

Figure 4:
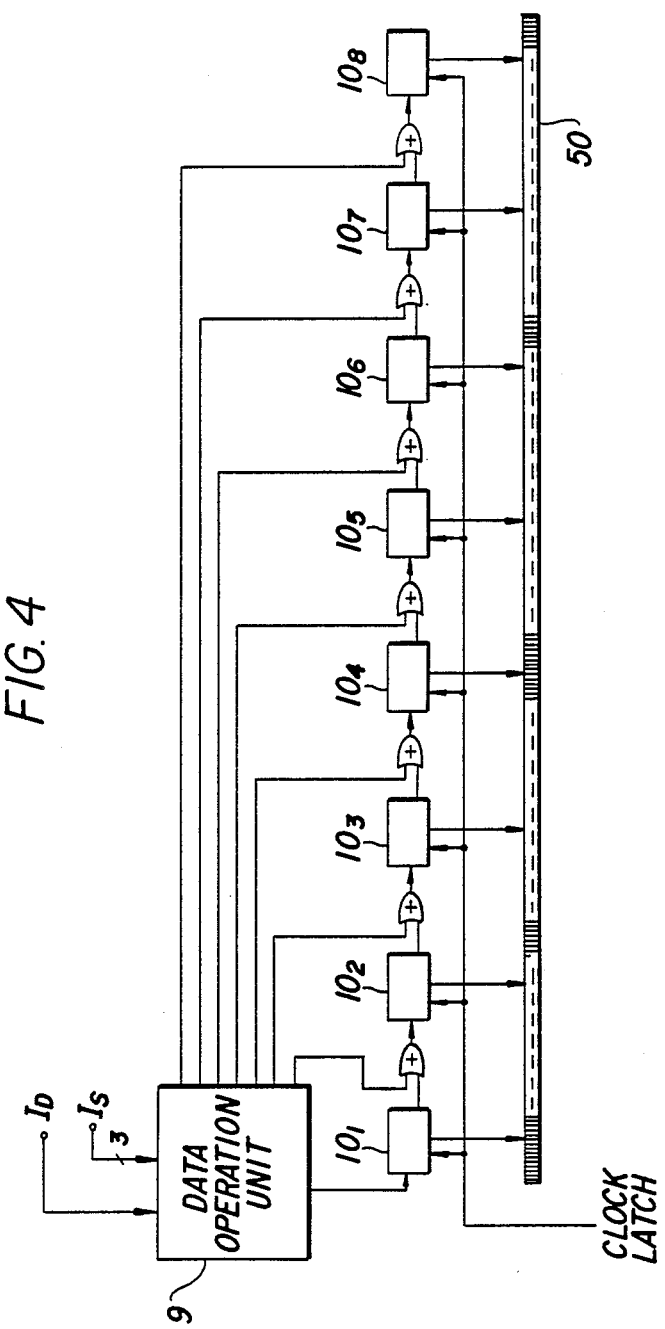
FIG. 4 shows a modified example of the heating element driving apparatus of FIG. 2.

In the case of the embodiment shown in FIG. 2, the contents of the output register 7 is written in series in the shift register 53, so all the data stored in the shift register 53 must be exchanged every time the heating elements are addressed one time in response to the contents of the shift register 53. In order to shorten the loading time, an arrangement is shown in FIG. 4. In this figure, data is fed only to necessary portion by a data operation unit, and the data from the output register 7 of FIG. 2 is fed to a data input I of the data operation unit 9, instead of being fed to the shift register 53. On the other hand, a plurality of heating elements 50 arranged similarly with those of FIG. 1 are divided into a plurality of groups, and drive units are provided corresponding to the respective groups for addressing and driving the heat elements thereof. In FIG. 4, there are 512 heating elements 50 and they are grouped into eight groups and addressed by eight drive units $10_1-10_8$ so that 64 heating elements are addressed and driven by one drive unit. In response to determining which range of the pixel data register 4 is to supply the data to be read out, the appropriate drive unit among the drive units $10^1-10_8$ is selected by a three bit selection signal applied to the selection input Is of the data operation unit 9. The respective drive units all have the same arrangement and have a circuit for selectively addressing and driving 64 heating elements by the shift register, latch and gates similar to those of FIG. 1.

Figure 5:
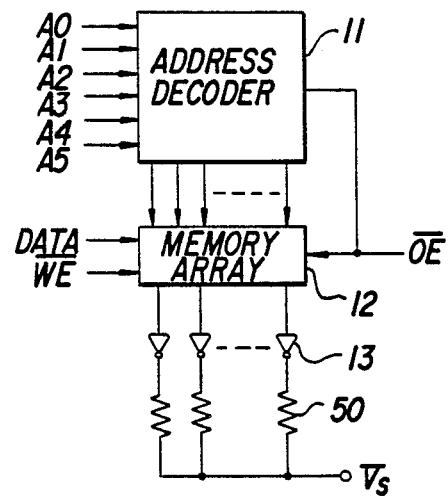
FIG. 5 shows another modified example of the heating element driving apparatus of FIG. 2.

As described above, although the drive units $10_1-10_8$ of FIG. 3 are arranged to be provided with the shift register, latch and gates, each of the drive units may be arranged as shown in FIG. 5 to reduce the time required for loading the data. In this figure, the reference numeral 11 is an address decoder into which address signals A0-A5 of six bits are used as input. The address decoder 11 supplies an output 12 of 64 bits to a memory array in response to the input address signal. When a write instruction signal WE is applied into the memory array 12, the data from the data operation unit 9 (FIG. 4) is written in a predetermined position of the memory array 12. When a read-out instruction signal OE is applied to the memory array 12, the data within the memory array 12 is read out, and the heating elements 50 are addressed and driven by drivers 13 in accordance with whether the data is "1" or "0".

As described in detail in connection with the above embodiments, in the present invention each of N number of heating elements is capable of being driven at most A times to print one line of image pixels with a dye density level having A steps, while the range of addressing the heating elements is varied. Accordingly, there is no risk of any particular heating element being positioned at the end of the group as in the case of the prior art driving apparatus, and so-called group line effects can be minimized. Moreover, since only a fraction of the heating elements are driven, the power source for driving the heating elements may be one having a small capacity. Assuming the duty ratio of the head is 25%, the power source may have a current capacity of quarter times as small as the capacity in the case of simultaneously addressing all the heating elements.

The invention has been described in detail with particular reference to certain preferred embodiments thereof, but it will be understood that variations and modifications can be effected within the spirit and scope of the invention.

We claim:

1. Thermal printing apparatus for forming a continuous tone dye image composed of dye image pixels, each image pixel having A different possible dye density levels comprising:
   a. a thermal print head for printing a line of image pixels, and including a number N of heating elements, each heating element being addressed during A consecutive heating cycles;

b. means for addressing at least one and no more than L consecutive heating elements during any given heating cycle and for addressing at least one different heating element during the next heating cycle, wherein N is at least equal to 2 times L and L and N are integers, said addressing means addressing each heating element A times; and c. means for selectively energizing each addressed heating element until each heating element delivers sufficient energy to cause a desired amount of dye to be transferred, whereby group line effects are minimized.

* * * * *